United States Patent [19]

Suzuki

[11] Patent Number: 5,694,174
[45] Date of Patent: Dec. 2, 1997

[54] TELEVISION SYSTEM CAPABLE OF SYNCHRONIZING A RECEIVER WITH A TRANSMITTER BY USING A REFERENCE SIGNAL HAVING A VARYING PHASE ANGLE

[75] Inventor: Norio Suzuki, Tokyo, Japan

[73] Assignee: NEC Corporation, Tokyo, Japan

[21] Appl. No.: 546,949

[22] Filed: Oct. 23, 1995

[30] Foreign Application Priority Data

Oct. 21, 1994 [JP] Japan .................................. 6-256921
Dec. 21, 1994 [JP] Japan .................................. 6-317891

[51] Int. Cl.$^6$ .................................................. H04N 9/475
[52] U.S. Cl. ........................................ 348/518; 348/519
[58] Field of Search ................................ 348/500, 518, 348/505, 506, 507, 508, 519

[56] References Cited

U.S. PATENT DOCUMENTS 4,349,832  9/1982  Gallo ........................................ 348/500

FOREIGN PATENT DOCUMENTS 230392  1/1990  Japan .

Primary Examiner—Victor R. Kostak
Attorney, Agent, or Firm—Sughrue, Mion, Zinn, Macpeak & Seas, PLLC

[57] ABSTRACT

In a television signal transmission system including a transmitter and a receiver, a reference signal has a phase angle between 0° and 360° within a single cycle. The phase angle of the reference signal is successively produced by a phase angle generator and transmitted from the transmitter and is reproduced by the receiver to be compared with a received phase angle. The phase angle is modified by a compensation phase angle obtained from a phase difference in the transmitter and the receiver. The reference signal may be either a color subcarrier signal or a sequence of sampling clocks.

18 Claims, 7 Drawing Sheets

TELEVISION SYSTEM CAPABLE OF SYNCHRONIZING A RECEIVER WITH A TRANSMITTER BY USING A REFERENCE SIGNAL HAVING A VARYING PHASE ANGLE

BACKGROUND OF THE INVENTION

This invention relates to a television system operable in response to a television signal to produce a sequence of digital television signals at a transmission rate and to reproduce the television signal.

As well known in the art, a transmission system of the type described includes a transmitter and a receiver to transmit and receive a sequence of digital television signals, respectively. Specifically, the transmitter is supplied as an input television signal with an analog television signal to sample the input television signal into a sequence of sampled television signals by a sequence of sampling clocks having a sampling rate. The sampled television signal sequence is encoded into the digital television signal which is sent from the transmitter as a sequence of output television signals at a transmission rate which may be different from the sampling rate. On the other hand, the receiver is supplied with the output television signal sequence to reproduce the television signal into a reproduced television signal by the use of a sequence of reproduced sampling clocks.

From this fact, it is readily understood that the sampling clock sequence of the transmitter must be synchronized with the reproduced sampling clock sequence of the receiver.

To this end, a sampling clock reproduction system has been proposed as such a transmission system in Japanese Unexamined Patent Publication No. Hei 2-30,292, namely, 30,292/1990 by the instant inventor. The sampling clock reproduction system is operable in response to a color television signal which includes a color subcarrier signal of 3.58 MHz together with a luminance signal and a chroma signal.

Specifically, a sequence of sampling clocks is produced in a transmitter by multiplying the color subcarrier signal and is synchronized with the color subcarrier signal. The color television signal is sampled into a sequence of sampled color television signals by the sampling clock sequence.

On the other hand, the sampling clock sequence is frequency divided into a sequence of reference phase signals which is synchronized in phase with the sampling clock sequence and which has a period equal to an integral multiple of the period of the sampling clock sequence. The reference phase signal sequence is sampled and thereafter multiplexed with the sampled color television signal sequence at a predetermined frame period to form the output television signal sequence transmitted at the transmission rate.

In the receiver, the output television signal sequence is decoded into the reproduced television signal by the use of a sequence of reproduced sampling clocks while a sequence of reproduced reference phase signals is derived from the output television signal sequence and is compared with a sequence of reception reference phase signals extracted from the reproduced sampling clocks. The reproduced sampling clocks are controlled in accordance with a phase difference between the reproduced reference phase signals and the reception reference phase signals to adjust the phase of the reproduced sampling clocks.

With this structure, it is possible not only to synchronize the frequency of the sampling clock sequence with that of the reproduced sampling clock sequence but also to synchronize the phase of the sampling clock sequence with that of the reproduced sampling clock sequence.

Herein, it is noted that the phase reference signals included in the output television signal sequence are compared with the reproduced reference phase signals at the predetermined frame period and that each of the phase reference signals and the reproduced reference phase signals are represented by a sequence of binary signals which is sampled at a reference sampling period.

As a result, a result of comparison between the phase reference signals and the reproduced reference phase signals includes jitters in dependency upon both lengths of the reference sampling period and the predetermined frame period. In order to absorb such jitters, the result of comparison should be smoothed for a sufficiently long time in comparison with the reference sampling period.

This means that a very long duration is necessary until the phases of the sampling clocks and the reproduced sampling clocks are coincident with each other. Therefore, the receiver can not quickly respond to an operation of switching channels from one to another in the transmitter and frequency and/or phase variation of the subcarrier signals.

SUMMARY OF THE INVENTION

It is an object of this invention to provide a transmission system which is capable of quickly responding to channel switching and variation of subcarrier signals.

It is another object of this invention to provide a transmission system of the type described, which is capable of adaptively adjusting a phase and a frequency of a reproduced signal sequence in a receiver to a signal sequence generated in a transmitter.

It is still another object of this invention to provide a sampling clock reproduction system which is capable of adaptively and quickly responding to channel switching and variation of the subcarrier signals.

It is yet another object of this invention to provide a sampling clock reproduction system of the type described, which is capable of adaptively adjusting the phase of the sampling clocks between the transmitter and the receiver.

According to an aspect of this invention, a television signal transmitter is operable in response to an input television signal to produce an output television signal and comprises reference signal producing means for producing a reference signal which is concerned with each of the input and the output television signals and which has a phase angle successively varied within each cycle of the reference signal, phase angle signal producing means supplied with the reference signal for producing a phase angle signal representative of the phase angle of the reference signal, processing means for processing the input television signal into a sequence of processed television signals, and multiplexing means for multiplexing the processed television signal sequence and the phase angle signal into the output television signal.

According to another aspect of this invention, a television signal receiver is operable in response to a reception television signal to produce a reproduced television signal. The reception television signal includes a reference signal which is associated with each of the reception and the reproduced television signals and which has a phase angle successively varied within each cycle of the reference signal together with a phase angle signal representative of the phase angle of the reference signal. Specifically, the television signal receiver comprises demultiplexing means for demultiplexing the reception television signal into the phase angle signal as a demultiplexed phase angle signal, reference signal reproducing means supplied with the reproduced television signal for producing a reproduced reference signal, phase angle signal means supplied with the demultiplexed phase angle signal and the reproduced reference signal for producing a reproduced phase angle signal with reference to the reproduced reference signal, phase angle comparing means for comparing the reproduced phase angle signal with the demultiplexed phase angle signal to produce a difference signal representative of a difference between the reproduced phase angle signal and the demultiplexed phase angle signal, and television signal producing means for producing the reproduced television signal with reference to the difference signal.

According to still another aspect of this invention, a television signal transmission system comprises a transmitter operable in response to an input television signal to produce an output television signal and a receiver supplied with the output television signal as a reception television signal to produce a reproduced television signal. Each of the input, the output, the reception, and the reproduced television signals includes an image signal. The transmitter comprises reference signal producing means for producing a reference signal which is concerned with each of the input and the output television signals and which has a phase angle successively varied within each cycle of the reference signal, phase angle signal producing means supplied with the reference signal for producing a phase angle signal representative of the phase angle of the reference signal, processing means for processing the input television signal into a sequence of processed television signals, and multiplexing means for multiplexing the processed television signal sequence and the phase angle signal into the output television signal. The receiver comprises demultiplexing means for demultiplexing the reception television signal into the image signal and the phase angle signal produced as a demultiplexed phase angle signal, reference signal reproducing means supplied with the reproduced television signal for producing a reproduced reference signal, phase angle signal means supplied with the demultiplexed phase angle signal and the reproduced reference signal for producing a reproduced phase angle signal with reference to the reproduced reference signal, phase angle comparing means for comparing the reproduced phase angle signal with the demultiplexed phase angle signal to produce a difference signal representative of a difference between the reproduced phase angle signal and the demultiplexed phase angle signal, and television signal producing means for producing the reproduced television signal with reference to the difference signal.

Each of the reference signal and the reproduced reference signal may be either a color subcarrier signal or a sequence of sampling clocks.

DESCRIPTION OF THE PREFERRED EMBODIMENTS

Figure 1A:
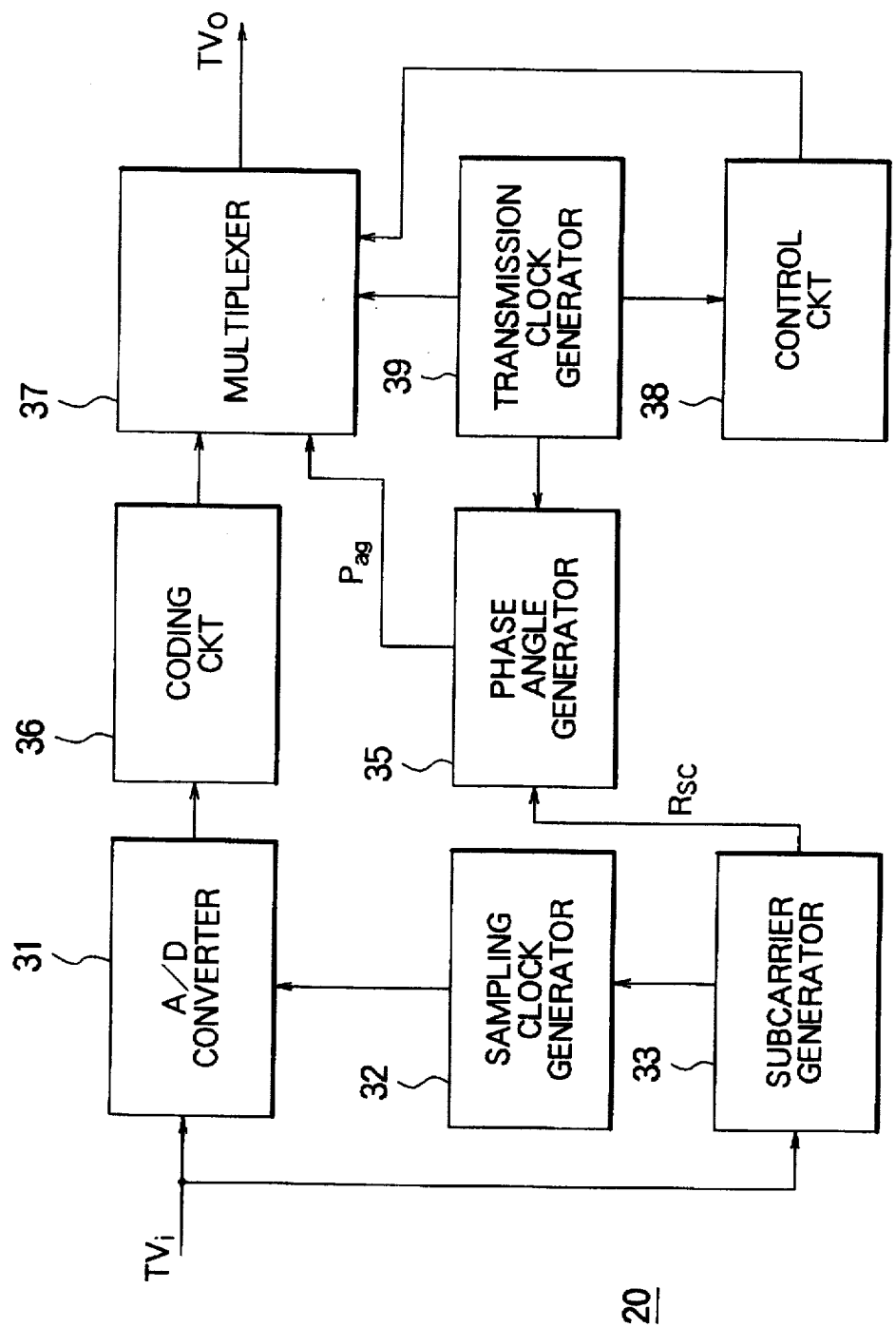
FIGS. 1A and B show block diagrams of a transmitter and a receiver according to a first embodiment of this invention.
Figure 1B:
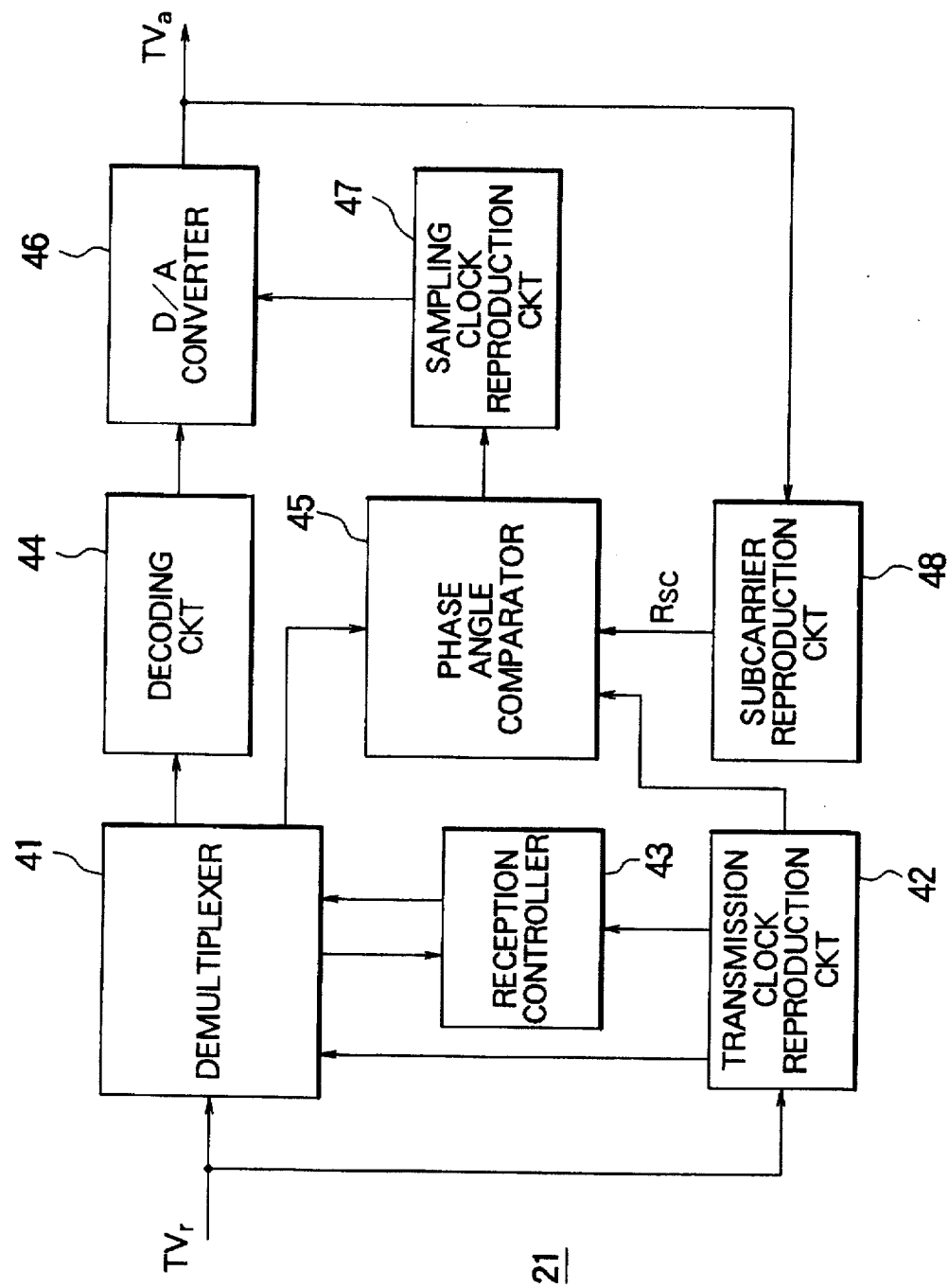

Referring to FIGS. 1A and 1B, a transmission system according to a first embodiment of this invention includes a transmitter 20 as illustrated in FIG. 1A and a receiver 21 as shown in FIG. 1B. The transmitter 20 is supplied with an input television signal TVi of an analog form to produce, as a digital signal sequence, a sequence of output television signals TVo which has a transmission rate, namely, a bit rate of, for example 44.735 MHz. The transmission rate is specified by a sequence of transmission clocks, as will become clear later.

The input television signal may be called an input analog television signal and considered as an NTSC color television signal which includes a color subcarrier signal of a subcarrier frequency of about 3.58 (accurately, 3.579545) MHz together with a chroma signal and a luminance signal.

As shown in FIG. 1A, the input television signal TVi is delivered to an analog-to-digital (A/D) converter 31 which is operable in response to a sequence of sampling clocks sent from a sampling clock generator 32. The sampling clock sequence has a frequency equal to three times the subcarrier frequency in the illustrated example. To this end, the sampling clock generator 32 is coupled to or controlled by a subcarrier generator 33 which is supplied with the input television signal TVi.

Practically, the subcarrier generator 33 extracts a color burst from the input television signal TVi and generates the color subcarrier signal synchronized with the color burst. The color subcarrier signal is sent to the sampling clock generator 32 and to a phase angle generator 35.

Responsive to the color subcarrier signal extracted, the sampling clock generator 32 generates the sampling clock sequence in the manner mentioned above and therefore may be structured by a frequency multiplier having a factor of three. The A/D converter 31 samples the input television signal TVi by the sampling clock sequence into a sequence of sampled television signals and converts each of the sampled television signals into a PCM television signal of eight bits and may be a combination of a sampler unit and an A/D converter unit.

Each of the PCM television signals is successively sent to a coding circuit 36 which carries out a coding operation by the use of a DPCM technique or the like. As a result, the coding circuit 36 produces a sequence of coded television signals subjected to data compression and supplies the same to a multiplexer 37 which is connected to the phase angle generator 35, a control circuit 38, and a transmission clock generator 39. For convenience of description, a combination of the A/D converter 31 and the coding circuit 36 may be called a processing circuit for processing the input television signal TV. In this connection, the coded television signal sequence may be referred to as a sequence of processed television signals.

Herein, the color subcarrier signal which is extracted by the subcarrier generator 33 is given to the phase angle generator 35 as a reference subcarrier signal Rsc of the subcarrier frequency. It is to be noted that the phase angle generator 35 serves to produce, at every transmission clock, a phase angle signal Pag which corresponds to a phase angle of each cycle or period of the color subcarrier signal in response to the reference subcarrier signal Rsc. As readily understood, each cycle of the color subcarrier signal or the reference subcarrier signal Rsc is varied within a phase angle which is between 0° and 360° and which is represented by the phase angle signal Pag. Specifically, the phase angle signal Pag is composed of N bits, where N is a natural number and is assumed to be equal to 10 bits hereinunder. In this event, the phase angle between 0° and 360° is represented by values of $2^{10}$, namely 1024. For example, when each cycle of the color subcarrier signal takes the phase angle of 90°, the phase angle signal Pag takes the phase angle value of 256 which is given by 1024×90/360 and which may be represented by a binary signal of 0100000000.

In FIG. 1A, the transmission clock generator 39 generates the transmission clock of the transmission rate, namely, 44.736 MHz which is delivered to the phase angle generator 35, the multiplexer 37, and the control circuit 38. The control circuit 38 produces a control signal to form a multiframe according to the DS3 standard in U.S.A. standard. In other words, the control signal is delivered to the multiplexer 37 at every multiframe of the DS3 standard and has a signal period equal to 4760 times a transmission clock period of the transmission clocks.

Thus, the multiplexer 37 multiplexes the coded television signal sequence with the phase angle signal Pag in accordance with the control signal to supply the output television signal sequence TVo to a transmission path. The output television signal sequence TVo is produced in the form of a bipolar signal. In this connection, the illustrated multiplexer 37 also includes a conversion circuit which converts a unipolar signal sent from the coding circuit 36 and the phase angle generator 35 into the bipolar signal and which may be called a U/B converter.

Referring to FIG. 1B, the output television signal sequence TVo is supplied as a sequence of reception television signals TVr through the transmission path to the receiver 21 as shown in FIG. 1B. The reception television signal sequence TVr carries the coded television signal sequence, a control data signal, and the phase angle signal of 10 bits and is delivered to a demultiplexer 41 and a transmission clock reproduction circuit 42.

The demultiplexer 41 is connected to the transmission clock reproduction circuit 42 for producing a sequence of reproduced transmission clocks from the reception television signal sequence TVr and a reception controller 43 for producing a reception control signal in a manner to be described later.

In the demultiplexer 41, the reception television signal sequence TVr is converted into the unipolar signal by a bipolar/unipolar (B/U) converter included in the demultiplexer 41 and demultiplexes the unipolar signal into the coded television signal sequence, the phase angle signal, and the control data signal on the basis of the reproduced transmission clock sequence and the reception control signal. The coded television signal sequence, the phase angle signal, and the control signal demultiplexed by the demultiplexer 41 may be often referred to as a demultiplexed coded television signal sequence, a demultiplexed phase angle signal, and a demultiplexed control data signal, respectively.

The demultiplexed coded television signal sequence is sent to a decoding circuit 44 while the demultiplexed phase angle signal and the demultiplexed control data signal are supplied to a phase angle comparator 45 and the reception controller 43, respectively.

On the other hand, the transmission clock reproduction circuit 42 reproduces the transmission clocks of 44.736 MHz and delivers the same to the demultiplexer 41, the reception controller 43, and the phase angle comparator 45. Herein, the reception controller 43 sends the reception control signal to the demultiplexer 41. Supplied with the transmission clocks and the reception control signal, the demultiplexer 41 detects the multiframe based on the DS3 standard and demultiplexes a multiplexed signal composed of the demultiplexed coded television signal sequence within the multiframe. The phase angle comparator 45 controls a timing of comparison in response to the transmission clocks in a manner to be mentioned later.

In addition, the decoding circuit 44 decodes the demultiplexed coded television signal sequence into a sequence of decoded television signals which may be referred to as a sequence of reproduced digital television signals and which is sent to a digital-to-analog (D/A) converter 46. The D/A converter 46 is connected to a sampling clock reproduction circuit 47 coupled to the phase angle comparator 45. The D/A converter 46 converts the reproduced digital television signal sequence into a reproduced analog television signal TVa in accordance with a sequence of reproduced sampling clocks which is sent from the sampling clock reproduction circuit 47 under control of the phase angle comparator 45, as will become clear later.

The reproduced analog television signal TVa is delivered to an external circuit and to a subcarrier reproduction circuit 48 connected to the phase angle comparator 45. The subcarrier reproduction circuit 48 extracts the color burst from the reproduced analog television signal TVa to produce a reproduced color subcarrier signal synchronized with the color burst extracted by the subcarrier reproduction circuit 48. The reproduced color subcarrier signal is used in the phase angle comparator 45 as a reference subcarrier signal for comparison, as will be described.

Now, the phase angle comparator 45 at first calculates a first phase angle signal of 10 bits from the reproduced color subcarrier signal. The first phase angle signal represents a first phase angle value of the reproduced color subcarrier signal. In addition, the phase angle comparator 45 is supplied from the demultiplexer 41 with the demultiplexed phase angle signal which is demultiplexed by the demultiplexer 41 and which may be called a second phase angle signal representative of a second phase angle value.

Under the circumstances, the phase angle comparator 45 compares the first phase angle value with the second phase angle value at every time instant at which the second phase angle value is given from the demultiplexer 41. Furthermore, the phase angle comparator 45 subtracts the first phase angle value from the second phase angle value to calculate a difference value between the first and the second phase angle values and supplies the sampling clock reproduction circuit 47 with a difference signal representative of the difference value between the first and the second phase angle values. On calculation of the difference value, the phase angle comparator 45 practically carries out modulo arithmetic of 10 bits to obtain the difference value. The difference signal is sent to the sampling clock reproduction circuit 47.

Herein, if the difference value is positive, namely, the second phase angle value is greater than the first phase angle value, the phase angle of the reproduced color subcarrier signal is delayed in comparison with the phase angle of the color subcarrier signal of the reception color television signal TVr. In this event, the first phase angle value of the reproduced color subcarrier signal should be advanced relative to the second phase angle value. To this end, the sampling clock reproduction circuit 47 is controlled by the difference signal so that the frequency of the reproduced sampling clocks becomes high. Practically, inasmuch as the sampling clock reproduction circuit 47 includes a voltage controlled oscillator (VCO) controlled by the difference signal, the VCO is controlled by the difference signal.

To the contrary, if the difference value is negative, namely, the second phase angle value is smaller than the first phase angle value, the phase angle of the color subcarrier signal of the reproduced television signal TVa is advanced relative to that of the reception color television signal TVr. In this case, the phase angle of the color subcarrier signal of the reproduced analog television signal TVa is delayed so that the frequency of the reproduced sampling clocks becomes low.

Herein, it is noted that distinction between the positive and the negative values in the modulo arithmetic can be made by judging a most significant bit (MSB) of 10 bits. In the illustrated example, the MSB takes "0" and "1" for the positive and the negative values, respectively.

Thus, the reproduced analog television signal TVa which is produced from the D/A converter 46 has the phase angle synchronized with that of the color subcarrier in the transmitter 20. Therefore, when the reproduced analog television signal TVa is displayed on a vector scope in relation to the transmission television signal, the reproduced analog television signal TVa is displayed relative to the transmission television signal TVo with a delay time which may result from a transmission path and a processing circuit. However, it has been observed on the vector scope that the phase of the color burst in the reproduced analog television signal TVa is stably synchronized with that of the color burst in the transmission television signal TVo without any variation. This shows that the reproduced color burst is accurately synchronized in frequency and phase with the color burst transmitted from the transmitter 20.

Figure 2:
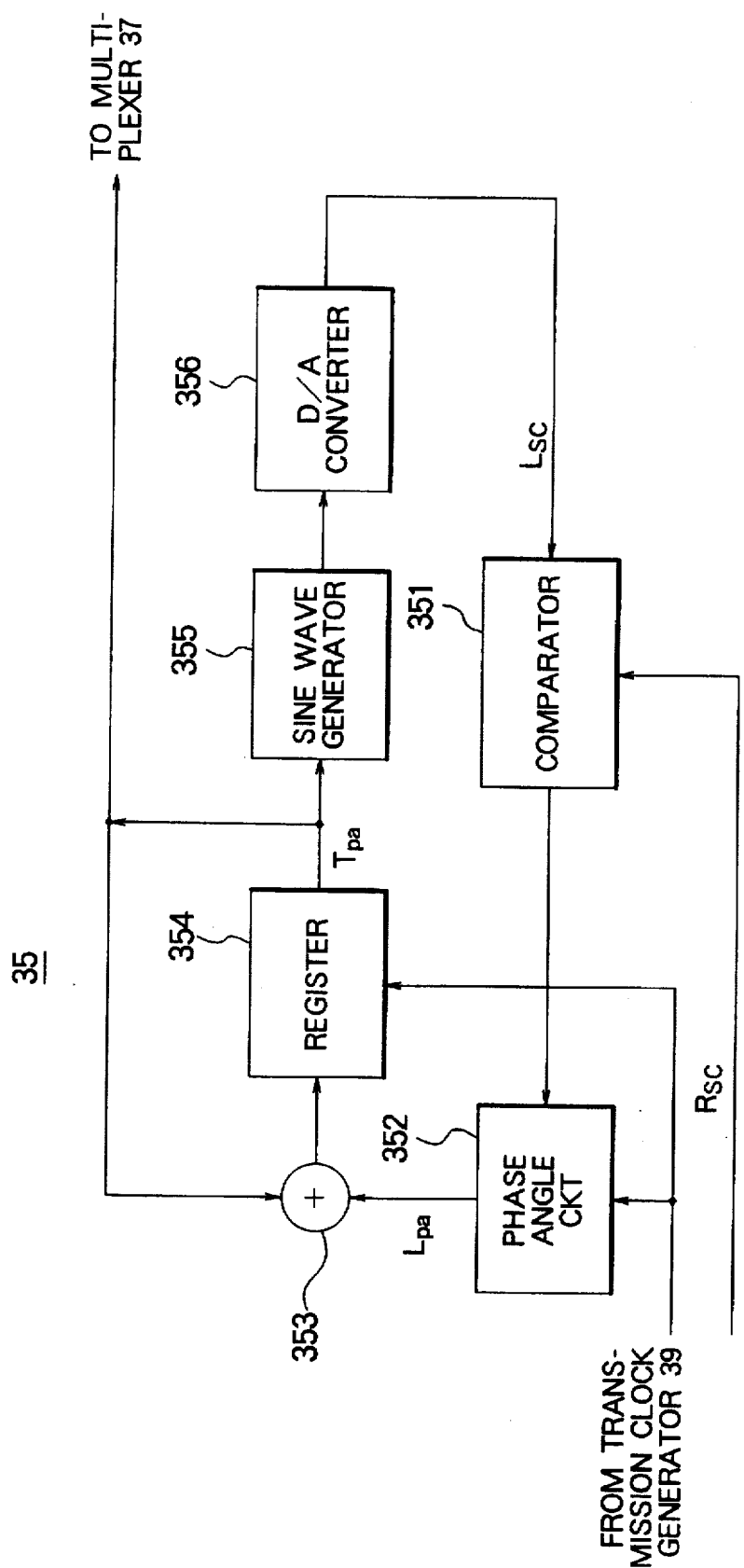
FIG. 2 shows a block diagram for use in describing a phase angle generator included in the transmitter of FIG. 1A.

Referring to FIG. 2 together with FIG. 1A, the illustrated phase angle generator 35 is supplied from the subcarrier generator 33 with the reproduced color subcarrier signal, namely, the reference subcarrier signal Rsc. In addition, the transmission clocks are also supplied from the transmission clock generator 39. The phase angle generator 35 includes a comparator 351, a phase angle circuit 352, an adder 353, a register 354, a sine wave generator 355, and a digital-to-analog (D/A) converter 356, all of which will be mentioned later in detail.

More specifically, the comparator 351 is given the reference subcarrier signal Rsc and a local subcarrier signal Lsc from the subcarrier generator 33 (FIG. 1A) and the D/A converter 356, respectively. The reference subcarrier signal Rsc is compared with the local subcarrier signal Lsc by the comparator 351. The comparator 351 produces a result signal or a compensation signal representative of a result of comparison between the reference and the local subcarrier signals Rsc and Lsc. In this event, when the phase of the local subcarrier signal Lsc is delayed relative to the phase of the reference subcarrier signal Rsc, the comparator 351 produces, as the result of comparison, a positive value specified by k=1 and delivers the positive value to the phase angle circuit 352. The positive value, namely, k=1 serves to advance the phase of the local subcarrier signal Lsc.

On the other hand, when the phase of the local subcarrier signal Lsc is delayed relative to the phase of the reference subcarrier signal Rsc, the comparator 351 produces, as the result of the comparison, a negative value specified by k=−1 and delivers the negative value to the phase angle circuit 352. The negative value of the comparator 351 serves to delay the phase of the local subcarrier signal Lsc. Each of the positive and the negative values may be called a compensation value k represented by the result signal.

At any rate, the result of comparison as mentioned above is sent as the result signal to the phase angle circuit 352. The phase angle circuit 352 produces a local phase angle signal Lpa which successively corresponds to a phase angle of each cycle of the local subcarrier signal at every one of the transmission clocks. Specifically, the local phase angle signal Lpa specifies a sum of a phase angle value determined for each single transmission clock and the compensation value k determined by the result signal sent from the comparator 351.

For example, let a single cycle of 360° be represented by 10 bits, namely, 1024 while the color burst and the transmission clocks have the frequencies of 3.579545 MHz and 44.736 MHz, respectively.

Under the circumstances, the local phase angle for each single transmission clock is given by (360×3.579545/44.736) and becomes equal to 28.8054°. This shows that the phase angle is shifted or moved by 28.8054° at every transmission clock within each cycle of the local subcarrier signal Lsc. Likewise, when the phase angle for each cycle is represented by 10 bits, a phase angle unit value is given by (1024×3.579545/44.736) and rendered equal to 81.9352. This value may be rounded to an integer value of 82 and may be used as the phase angle value at every transmission clock. From this fact, it is readily understood that the phase angle unit value is successively increased or changed by the integer value of 82 at every one of the transmission clocks and that the integer value of 82 corresponds to about 28.8 degrees.

Taking the above into consideration, the phase angle circuit 352 calculates the sum of the phase angle unit value of 82 and the compensation value k to obtain a local phase angle equal to (82+k) and to produce the local phase angle signal Lpa representative of (82+k) at every transmission clock.

The local phase angle signal Lpa is sent to the adder 353 which is connected to the register 354 and which is operable in response to a feedback signal which is delivered from the register 354, as will be presently described. Thus, the adder 353 adds the local phase angle signal Lpa to the feedback signal to produce an addition signal representative of a result of addition between the local phase angle signal Lpa and the feedback signal and to supply the addition signal to the register 354.

Practically, the adder 353 carries out modulo arithmetic of 10 bits between the local phase angle signal Lpa and the feedback signal to produce the addition signal of 10 bits in parallel.

Herein, it is noted that the addition signal successively specifies a phase angle of the output television signal TVo and is kept in the register 354 for a single transmission clock period, namely, until a next following one of the transmission clocks. The addition signal is produced as a register output signal of 10 bits. The register output signal is sent as a transmission phase angle signal Tpa to the multiplexer 37 (FIG. 1(A)) on one hand and fed back to the adder 353 as the feedback signal as the feedback signal on the other hand. In addition, the register output signal is also sent to the sine wave generator 355, as shown in FIG. 2. The transmission phase angle signal Tpa is produced at every transmission clock because the register 354 is operated at every transmission clock.

With this structure, the local phase angle signal Lpa is successively added or integrated to each other by the use of the adder 353 and the register 354 at every transmission clock to produce the transmission phase angle signal Tpa. Thus, a combination of the adder 353 and the register 354 serves as an integrator.

Supplied with the register output signal, namely, the transmission phase angle signal Tpa, the sine wave generator 355 generates the local subcarrier signal Lsc of a sine wave in accordance with a PCM technique. To this end, the sine wave generator 355 includes a ROM which stores PCM values of 8 bits at addresses. The ROM is given the transmission phase angle signal Tpa as address signals representative of either one of 0 to 1023. As a result, the ROM produces the sine wave of a single cycle successively specified by the PCM values in response to the address signals. Thus, the transmission phase angle signal Tpa is converted into the PCM values by the sine wave generator 355. The PCM values is sent to the D/A converter 356 to be converted into an analog sine wave corresponding to the PCM values. The analog sine wave is supplied to the comparator 351 as the local subcarrier signal Lsc.

Consequently, the reference subcarrier signal Rsc is synchronized in phase with the local subcarrier signal Lsc by feedback control as mentioned above. Thus, the register 354 can produce the transmission phase angle signal synchronized with the reference subcarrier signal Rsc.

Figure 3:
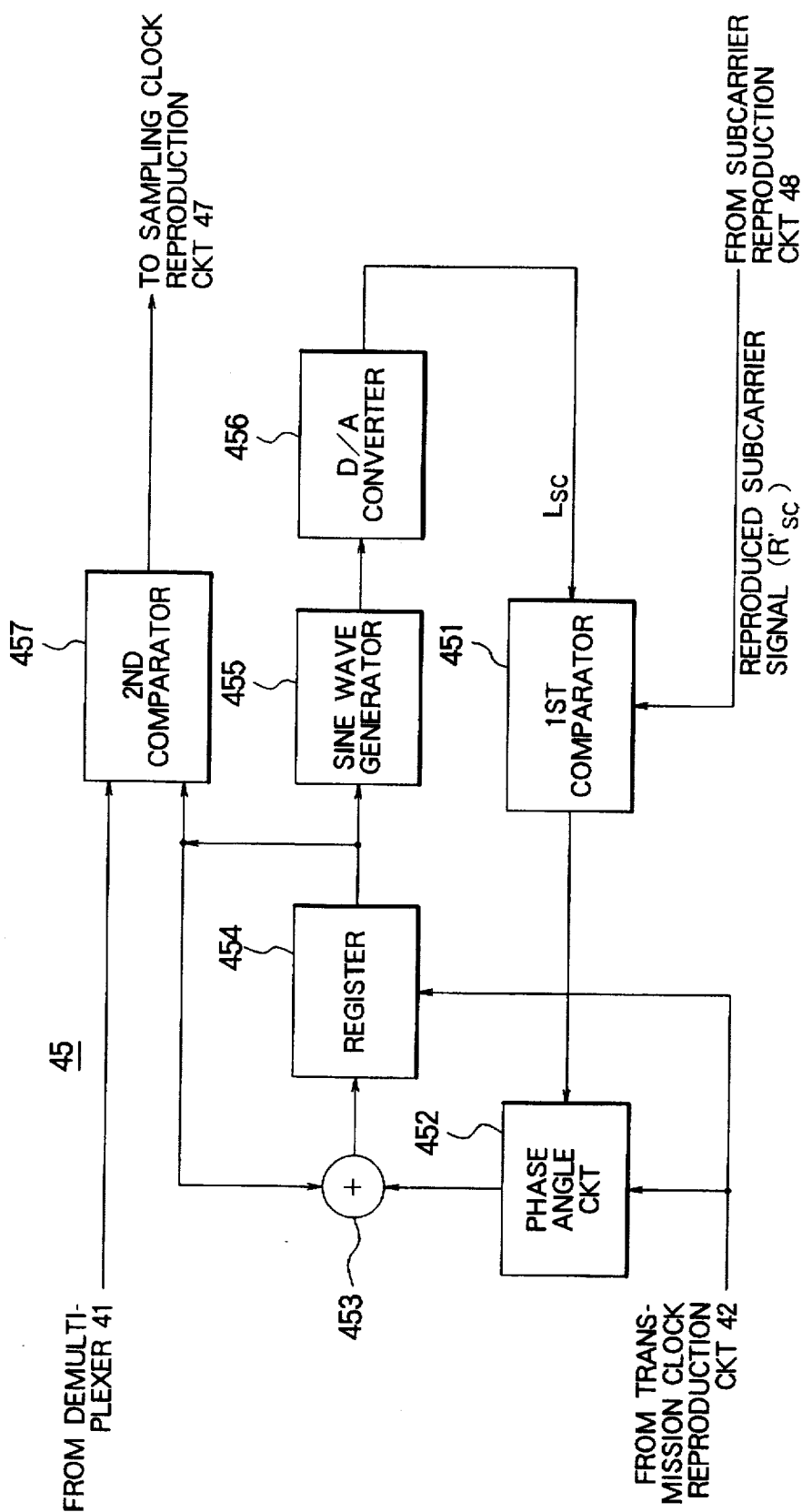
FIG. 3 shows a block diagram for use in describing a phase angle comparator illustrated in FIG. 1B.

Referring to FIG. 3 afresh together with FIG. 1B, the phase angle comparator 45 will be described in detail and is connected to the demultiplexer 41, the subcarrier reproduction circuit 48, and the sampling clock reproduction circuit 47, as illustrated in FIG. 1B. The illustrated phase angle comparator 45 is supplied with the reproduced subcarrier signal R'sc and the demultiplexed angle signal from the subcarrier reproduction circuit 48 and the demultiplexer 41, respectively. In addition, the phase angle comparator 45 comprises a first comparator 451, a phase angle circuit 452, an adder 453, a register 454, a sine wave generator 455, and a D/A converter 456, which are similar in structure and operation to the comparator 351, the phase angle circuit 352, the adder 353, the register 354, the sine wave generator 355, and the D/A converter 356, respectively, illustrated in FIG. 2.

In other words, the phase angle comparator 45 illustrated in FIG. 3 is different from that shown in FIG. 2 in that a second comparator 457 is included to compare the demultiplexed phase angle (namely, the second phase angle value) with the first phase angle value (namely, a reproduced phase angle value) derived from the reproduced subcarrier signal each time when the second phase angle value is received.

More specifically, when the first phase angle value is delayed relative to the second phase angle value, the second comparator 457 supplies the sampling clock reproduction circuit 47 (FIG. 1B) with a positive value signal representative of a positive value. As a result, the sampling clock reproduction circuit 47 increases the frequency of the reproduction sampling clocks so as to advance the phase angle of the reproduced subcarrier signal. On the other hand, when the first phase angle value is advanced relative to the second phase angle value, namely, the reference value, the second comparator 457 supplies the sampling clock reproduction circuit 47 with a negative value signal representative of a negative value so as to reduce the frequency of the reproduction sampling clocks.

In the illustrated example, the above description has been made on the assumption that the reference subcarrier signal has been adjusted to the color subcarrier signal. However, the reference subcarrier signal may be replaced by a signal obtained by frequency dividing the color subcarrier signal. Thus, when the signal which is different in frequency from the color subcarrier signal is selected as a reference signal, each of the phase angle circuits 352 and 452 illustrated in FIGS. 2 and 3 produces the phase angle signal which indicates an advanced phase angle determined by a ratio between the frequency of the reference signal and the frequency of the transmission clocks.

Figure 4:
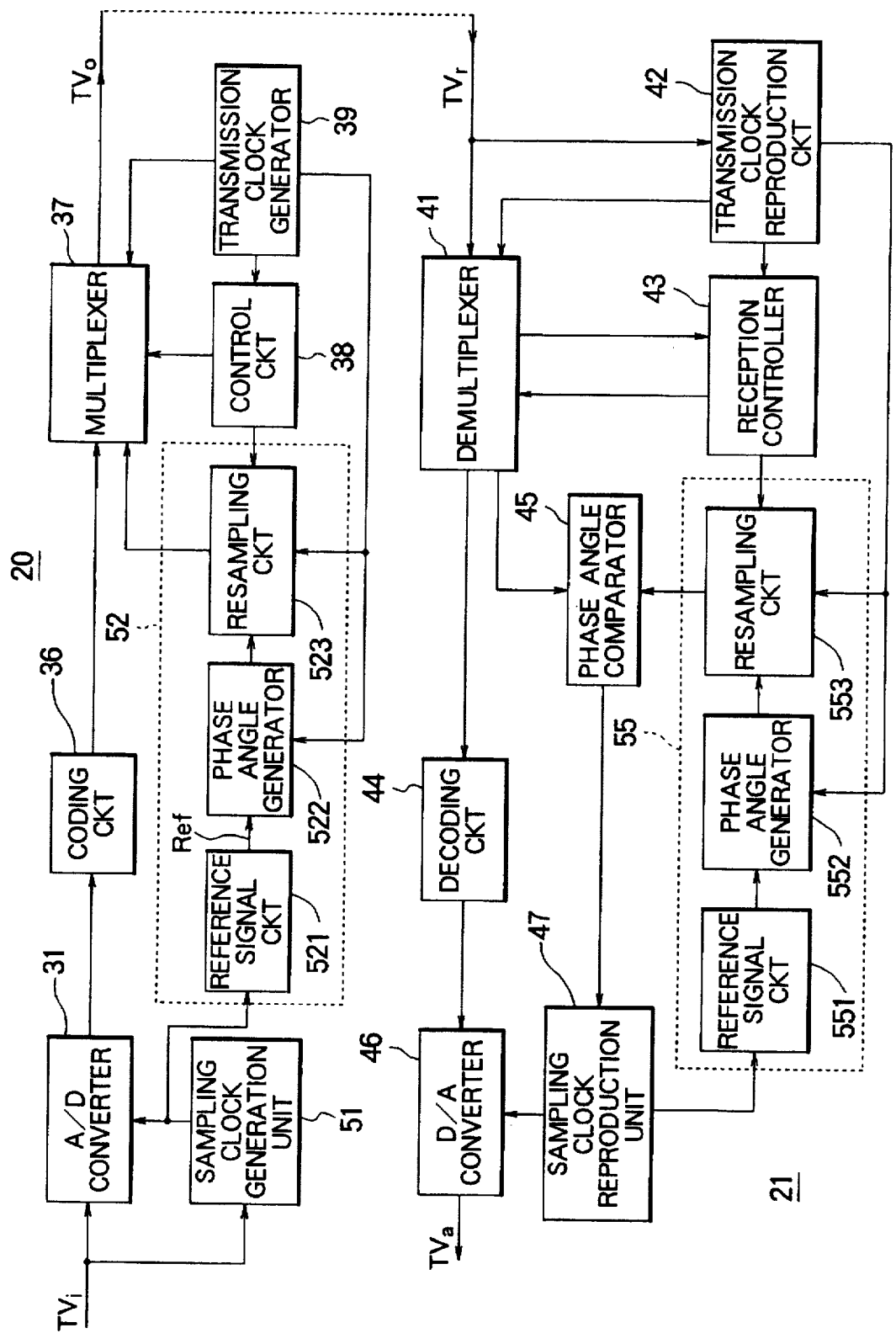
FIG. 4 shows a block diagram of a transmission system according to a second embodiment of this invention.

Referring to FIG. 4, a television system according to a second embodiment of this invention is similar in structure and operation to that illustrated in FIGS. 1A and 1B except that a sequence of sampling clocks is used to produce the phase angle signal instead of the color subcarrier signal, although the sampling clock sequence has a sampling clock frequency (3.58×3 MHz) equal to three times the subcarrier frequency of the color subcarrier signal fsc in the illustrated example. In fact, the sampling frequency may not be restricted to the above frequency.

Taking the above into consideration, similar parts are designated by like reference numerals or symbols in FIG. 4.

In FIG. 4, the NTSC color television signal is also supplied as the input analog television signal TVi to the transmitter 20 and is delivered to the A/D converter 31 and a sampling clock generation unit 51. Responsive to the input analog television signal TVi, the sampling clock generation unit 51 produces the sampling clocks which has the sampling clock frequency and which may be called a reference sampling clock signal.

The sampling clocks are delivered to the A/D converter 31 on one hand and to a phase angle producing circuit 52 on the other hand. The A/D converter 31 samples the input analog television signal TVi by the sampling clocks into a sequence of sampled television signals sent to the coding circuit 36. The coding circuit 36 codes the sampled television signal sequence into a sequence of coded television signals and sends the same to the multiplexer 37, like in FIG. 1A. In this event, the coding circuit 36 carries out the compression coding to produce each coded television signal of eight bits. Like in FIG. 1A, the multiplexer 37 is operated under control of the control circuit 38 and the transmission clock generator 39. The transmission clock generator 39 is assumed to produce the transmission clocks of 44.736 MHz in the illustrated example also.

The phase angle producing circuit 52 is operable to produce a phase angle signal which is representative of a phase angle value of the sampling clocks or the reference signal. Specifically, the phase angle producing circuit 52 is directly supplied from the sampling clock generation unit 51 with the sampling clocks in this example and includes a reference signal circuit 521, a phase angle generator 522, and a resampling circuit 523, as shown in FIG. 4.

Practically, the reference signal circuit 521 comprises a frequency divider which has a frequency division factor of three and a sine wave generator. Accordingly, the sampling clocks are frequency divided by the frequency divider into a sequence of reference clocks having a frequency equal to the subcarrier frequency of the color subcarrier signal and are converted by the sine wave generator into the reference signal Ref having a reference frequency equal to the subcarrier frequency fsc. The reference signal Ref is sent to the phase angle generator 522 which is substantially equivalent to the phase angle generator 35 illustrated in FIG. 2 and which will therefore not be described any longer.

At any rate, the phase angle generator 522 produces the phase angle signal of N bits which may be, for example, 10 bits each time when the transmission clocks of, for example, 44.736 MHz are received from the transmission clock generator 39. In this event, a phase angle of the reference signal Ref is successively varied between 0° and 360° within a single cycle of the reference signal Ref and is successively and discretely indicated by the phase angle signal at every sampling timing determined by the transmission clocks. Thus, a phase angle value is given by the phase angle generator 522 at every transmission clock in the digital manner.

For instance, let the phase angle of the reference signal Ref take 90° when a certain one of the transmission clocks is given at a certain time instant. In this case, the phase angle signal is specified by the phase angle value of 256 which may be given by "0100000000". As a result, the digital phase angle signal becomes equal to "0100000000" when the phase angle of the reference signal takes the phase angle of 90°.

The digital phase angle signal is supplied to the resampling circuit 523 which is controlled by the control circuit 38 and the transmission clock generator 39 and which is included in the multiplexer 37 in FIG. 1A. Herein, the control circuit 38 shown in FIG. 4 produces a frame control signal and a timing control signal as a control signal. The frame control signal serves to form a frame determined by the DS3 standard while the timing control signal serves to determine a transmission time instant of the digital phase angle signal in the resampling circuit 523. When the digital phase angle signal is sent to the multiplexer 37 at every multiframe determined by the DS3 standard, the timing control signal may be produced each time when the transmission clocks are counted to 4760.

Thus, the resampling circuit 523 is controlled by the timing control signal sent from the control circuit 38 and supplies the digital phase angle signal to the multiplexer 37 when the timing control signal is turned on.

The multiplexer 37 multiplexes the coded television signal, the digital phase angle signal, and any other control data signal into a unipolar transmission signal. As mentioned in conjunction with FIG. 1A, the multiplexer 37 converts the unipolar transmission signal into a bipolar transmission signal which is sent as the output television signal TVo to the receiver 21.

The output television signal TVo is received by the receiver 21 as the reception television signal TVr. In connection with the receiver 21, it is noted that a phase angle producing circuit 55 is substituted for the subcarrier reproduction circuit 48 illustrated in FIG. 1B and is similar in structure and operation to 52 of the transmitter 20 shown in FIG. 4.

The reception television signal TVr is delivered to the demultiplexer 41 and the transmission clock reproduction circuit 42. The demultiplexer 41 carries out bipolar-to-unipolar (B/U) conversion of the reception television signal TVr and demultiplexes the reception television signal TVr converted into the unipolar signal. As a result, the demultiplexer 41 delivers the coded television signal, the digital phase angle signal, and the control data signal to the decoding circuit 44, the phase angle comparator 45, and the reception controller 43, respectively, under control of the reception controller 43 in the manner mentioned with reference to FIG. 1B.

On the other hand, the transmission clock reproduction circuit 42 reproduces the transmission clocks of 44.736 MHz and delivers the same to the demultiplexer 41, the reception controller 43, and a phase angle producing circuit 55.

Herein, the reception controller 43 detects, from the reception television signal TVr, the multiframe determined by the DS3 standard and supplies a reception control signal to the demultiplexer 41 to separate the coded television signal. In addition, the reception controller 43 delivers a reception timing control signal to the phase angle producing circuit 55 to extract the digital phase angle signal at every multiframe determined by the DS3 standard.

Under the circumstances, the coded television signal demultiplexed by the demultiplexer 41 is decoded into a sequence of reproduced digital television signals by the decoding circuit 44 and is thereafter converted into a reproduced analog television signal TVa under control of the sampling clock reproduction circuit 47 which may comprise a voltage controlled oscillator (VCO) controlled by the phase angle comparator 45 like in FIG. 1B. In any event, the sampling clock reproduction circuit 47 produces a sequence of reproduced sampling clocks which has a reproduced sampling frequency equal to three times the subcarrier frequency of the color subcarrier signal.

In the illustrated example, the reproduced sampling clocks are sent not only to the D/A converter 46 but also to the phase angle producing circuit 55. The phase angle producing circuit 55 is identical with the phase angle producing circuit 52 of the transmitter 20 and therefore comprises a reference signal circuit 551, a phase angle generator 552, and a resampling circuit 553 which are identical with 521, 522, and 523, respectively. More particularly, the reference signal circuit 551 is structured by a frequency divider to frequency divide the reproduced sampling clocks into a reproduced reference signal which has a reproduced reference frequency equal to the subcarrier frequency. The phase angle generator 552 is supplied with the reproduced reference signal to produce a phase angle signal in the manner mentioned with reference to the phase angle generator 522. At any rate, the phase angle signal is composed of N bits which may be, for example, eight bits and may be called a reproduced phase angle signal. The reproduced phase angle signal is representative of a phase angle within a single cycle of the reproduced reference signal. In other words, a phase angle value is specified by the reproduced phase angle signal of N bits. The resampling circuit 553 supplies the reproduced phase angle signal to the phase angle comparator 45 at every multiframe of the reproduced reference signal.

The phase angle comparator 45 compares the demultiplexed phase angle signal with the reproduced phase angle signal to calculate a difference between the demultiplexed phase angle signal and the reproduced phase angle signal and to produce a phase angle difference signal representative of the difference. Practically, the difference is calculated by subtracting the demultiplexed phase angle signal from the reproduced phase angle signal. The subtraction is carried out by the modulo arithmetic of 10 bits. The phase angle difference signal is sent to the sampling clock reproduction circuit 47.

The sampling clock reproduction circuit 47 has the VCO controlled by the phase angle difference signal and produces the reproduced sampling clocks controlled by the phase angle difference signal. For example, if the phase angle difference signal is positive and the reproduced phase angle is delayed relative to the phase angle of the demultiplexed phase angle signal, the sampling clock reproduction circuit 47 is controlled to advance the reproduced sampling clocks. The resultant reproduced sampling clocks are increased in frequency. To the contrary, if the phase angle difference is negative and the reproduced phase angle is advanced relative to the demultiplexed phase angle signal, the phase angle of the reproduced sampling clocks is delayed by decreasing the frequency of the reproduced sampling clocks.

As known in the art, the transmission clocks are stable and are transmitted through a transmission path from the transmitter 20 to the receiver 21 with a constant transmission time. This shows that, when the phase angles of the reference signal are coincident with each other in both the transmitter and the receiver, the phase of the sampling clocks in the transmitter 20 can be synchronized with that of the reproduced sampling clocks in the receiver 21 after the constant transmission.

Consequently, the reproduced analog television signal TVa which is reproduced by the D/A converter 46 includes a color subcarrier signal which has a phase angle synchronized with that of the transmitter 20. This means that the phase of the color burst reproduced in the receiver 21 is not varied relative to the phase of the color burst produced by the transmitter 20, although a constant delay time which is based on the transmission path and a processing circuit is left between the phase angles of the transmitter 20 and the receiver 21. Thus, it is possible in the receiver 21 to produce the reproduced analog television signal which is synchronized in phase with the input analog television signal TVi of the transmitter 20.

Figure 5:
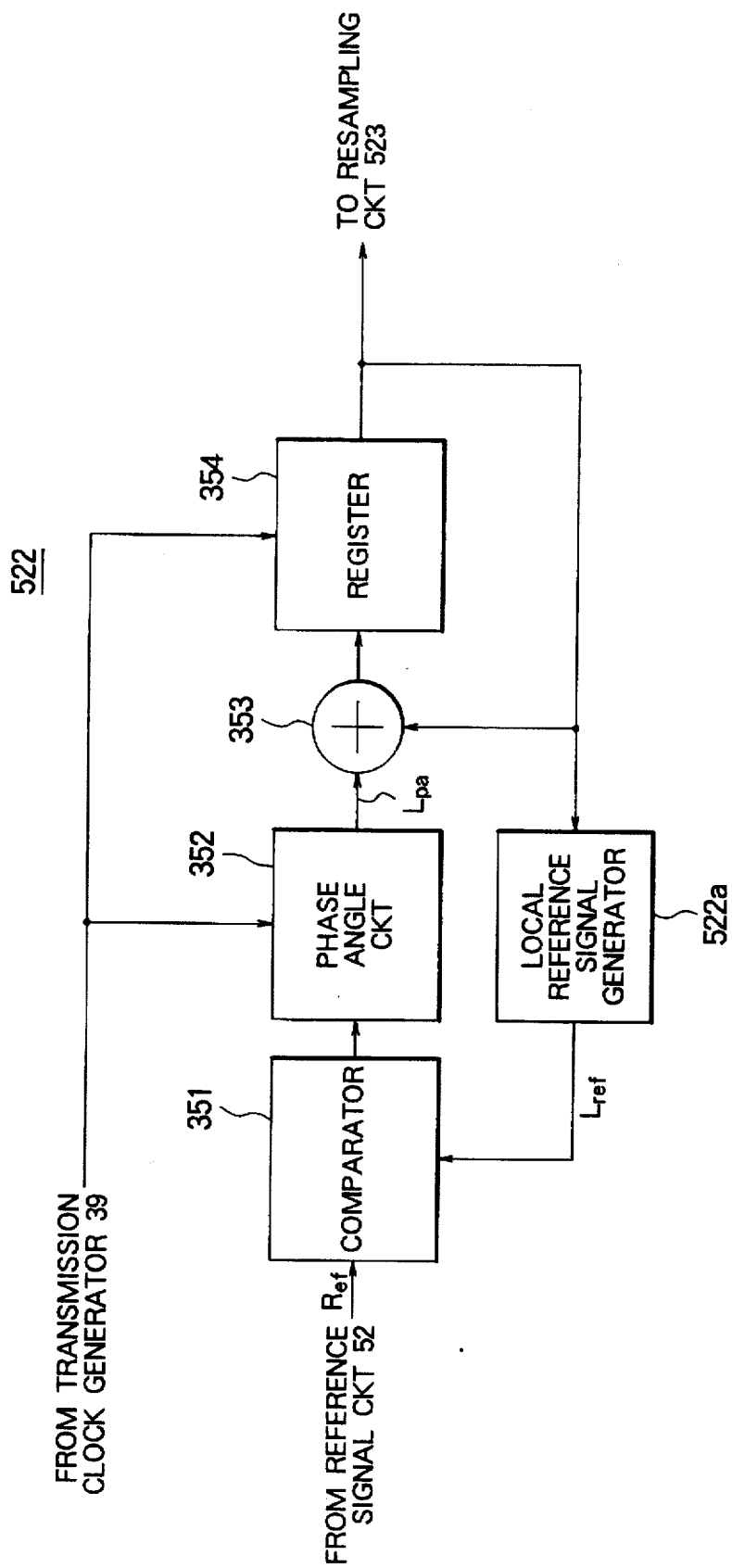
FIG. 5 shows a block diagram of a phase angle generator shown in FIG. 4.

Referring to FIG. 5, the phase angle generator 522 illustrated in FIG. 4 is similar in structure and operation to that illustrated in FIG. 2 except that the reference signal Ref is supplied from the reference signal circuit 521 to the phase angle generator 522 and that a local reference signal generator 522a is substituted for the combination of the sine wave generator 355 and the D/A converter 356 both of which are shown in FIG. 2. However, the local reference signal generator 522a may be considered to be equivalent to the combination of the sine wave generator 355 and the D/A converter 356. In this connection, similar elements and portions are designated by like reference numerals and symbols. In addition, the phase angle generator 552 in the receiver 21 is identical with that illustrated in FIG. 5 and will not be described any longer.

Herein, it is assumed that the sampling clock generation unit 51 in FIG. 4 produces the sampling clocks having the sampling clock frequency equal to three times the subcarrier frequency (indicated at fsc) and that the reference signal has the reference signal frequency which is equal to the subcarrier frequency fsc and which is obtained by frequency dividing the sampling clock frequency by the reference signal circuit 521 (FIG. 4). In addition, the transmission clocks are assumed to have a clock rate, namely, the transmission clock frequency (indicated at fd) of 44.736 MHz.

Under the circumstances, the phase angle of the reference signal is moved or changed by about 28.8054° at every one of the transmission clocks because the subcarrier frequency fsc is equal to 3.579545 MHz and the transmission clock frequency fd is 44.736 MHz. The phase angle of 28.8054° corresponds to the phase angle unit value of 81.9352 in term of ten bits representation, as mentioned in conjunction with FIG. 2. The phase angle unit value of 81.9352 is rounded to 82, like in the prior embodiment.

Figure 6:
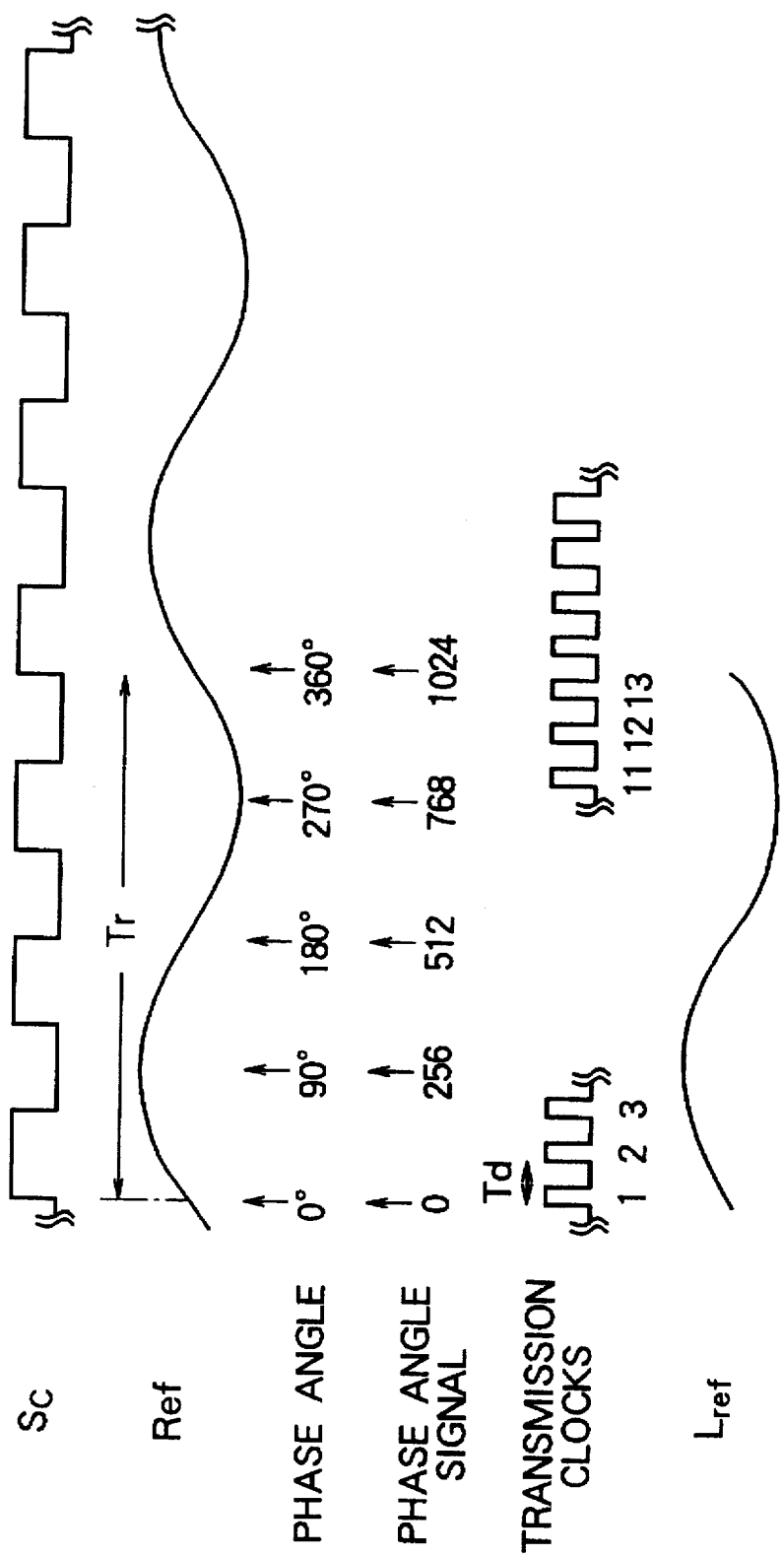
FIG. 6 shows waveforms for use in describing operation of the phase angle generator illustrated in FIG. 5.

Temporarily referring to FIG. 6 along with FIG. 5, the sampling clocks Sc (depicted along a top line of FIG. 6) are frequency divided into the reference signal Ref, as shown along a second line in FIG. 6. The illustrated reference signal Ref has a reference signal period Tr equal to three times a sampling period of the sampling clocks Sc. The reference signal Ref is given to the comparator 351 together with a local reference signal Lref (as shown along a bottom line in FIG. 6) which is sent from the local reference signal circuit 522a and which will be described later.

As shown in FIG. 6, when the reference signal Ref is specified by a sine wave as shown in FIG. 6, the phase angles of 90°, 180°, 270°, and 360° indicate phase angle positions of a single cycle of the reference signal and are represented by the phase angle signal of 10 bits indicative of phase angle values of 256, 512, 768, and 1024, respectively. The phase angle value which is represented by the phase angle signal is changed or increased by 82 at every one of the transmission clocks shown in FIG. 6 and is used to produce the local reference signal Lref. As illustrated in FIG. 6, the transmission clocks of about 12.5 are produced within the single cycle of the reference signal Ref.

Referring back to FIG. 5, the comparator 351 compares the reference signal Ref with the local reference signal Lref to produce a compensation signal or a result signal which is representative of a result of comparison defined by a compensation value k. When the phase of the local reference signal Lref is delayed relative to that of the reference signal Ref, the comparator 351 produces k=1 as the compensation value to advance the phase of the local reference signal Lref. On the other hand, when the phase of the local reference signal Lref is advanced relative to the reference signal Ref, the comparator 351 produces k=−1 as the compensation value to delay the phase of the local reference signal Lref.

The compensation value is sent to the phase angle circuit 352 to be added to the phase angle signal which is produced at every one of the transmission clocks. This shows that the phase angle value is increased by (82+k) and produced as the phase angle signal from the phase angle circuit 352 each time when the transmission clocks are given to the phase angle circuit 352.

The phase angle signal is sent to the adder 353 to be added to a current phase angle signal which is given from the register 354 at every one of the transmission clocks. A sum of the phase angle signal and the current phase angle signal is sent to the register 354 and is fed to the resampling circuit 523 (FIG. 4). The current phase angle signal is supplied as an output phase angle signal to the multiplexer 37 through the resampling circuit 523 (FIG. 4) and is also given to the local reference signal generator 522a. In addition, the current phase angle signal is converted into the local reference signal Lref in the manner described in conjunction with FIG. 2.

In the illustrated example, the compensation value k is successively added to the phase angle signal to be produced as the output phase angle signal. As a result, the phase angle circuit 352 carries out feedback control so that the phase difference between the reference signal Ref and the local reference signal Lref is rendered into zero. Thus, the phase of the reference signal Ref is made to be coincident with that of the reproduced reference signal Lref.

Although the above description has been made on the assumption that the frequency division factor is equal to three, the frequency division factor may not be restricted to three or may be equal to zero. In addition, the voltage controlled oscillator (VCO) which has a time constant is controlled by the phase angle difference signal. Accordingly, it is preferable that the frequency division factor is made large in consideration of the time constant when the transmission clocks are varied in a wide range or when a ratio between the sampling clocks and the transmission clocks is comparatively small.

Furthermore, the sampling clocks may have the sampling clock frequency not equal to three times the subcarrier frequency and may be produced in synchronism with an integral multiple of the horizontal synchronization signal included in the television signal. For example, the sampling clock frequency may be equal to (P/Q) times the horizontal synchronization signal, where P and Q are integers. The (P/Q) times may be, for example, 455/2.

Moreover, the bit number of the phase angle signal may not be restricted to 10 bits but increased in number, taking a necessary precision into account.

While this invention has thus far been described in conjunction with a few embodiments thereof, it will readily be possible for those skilled in the art to put this invention into practice in various other manners. For example, the sine wave generator 355 and 455 illustrated in FIGS. 2 and 3 may be replaced by a trapezoid wave generator for generating a trapezoid wave having an amplitude smaller than that of the sine wave. Such a trapezoid wave generator makes it possible to reduce a bit capacity of a read-only-memory (ROM). In this event, phase comparison may be carried out by detecting phase differences at zero cross points of the trapezoid wave which occur at the phase angles of 0 and 180 degrees. With this structure, the trapezoid wave may be obtained or determined from a single most significant bit of the phase angle signal. This structure dispenses with the D/A converter, such as 356 and 456.

What is claimed is:

1. A television signal transmitter operable in response to an input television signal to produce an output television signal, said television signal transmitter comprising:

reference signal producing means for producing a reference signal which is concerned with each of said input and said output television signals and which has a phase angle successively varied within each cycle of said reference signal;

phase angle signal producing means supplied with said reference signal for producing a phase angle signal representative of said phase angle of said reference signal;

processing means for processing said input television signal into a sequence of processed television signals; and multiplexing means for multiplexing said processed television signal sequence and said phase angle signal into said output television signal.

2. A television signal transmitter as claimed in claim 1, said input television signal including a color subcarrier signal of a subcarrier frequency, wherein said reference signal producing means comprises:

subcarrier signal generating means supplied with said input television signal for generating said subcarrier signal as said reference signal; and sampling clock generating means responsive to said subcarrier signal for producing a sequence of sampling signals;

said processing means comprising:

sampling means for sampling said input television signal by said sampling signal sequence into a sequence of sampled television signals; and coding means for coding said sampled television signal sequence into a sequence of coded television signals to produce said coded television signal sequence as said processed television signal sequence.

3. A television signal transmitter as claimed in claim 2, wherein said phase angle signal producing means comprises:

controllable compensation signal producing means responsive to said reference signal for producing a compensation signal which is representative of a compensation phase angle value of said phase angle signal;

local phase angle producing means for producing a local phase angle signal variable in dependency upon said compensation signal;

successively summing means for successively summing up the local phase angle signal to produce a summed phase angle signal representative of a next following phase angle;

means for producing said summed phase angle signal as the phase angle signal; and feedback means responsive to said phase angle signal for feeding, back to said compensation means, a local subcarrier signal which has the subcarrier frequency.

4. A television signal transmitter as claimed in claim 3, wherein said compensation signal producing means comprises:

comparing means for comparing said reference signal with said local subcarrier signal to calculate a difference signal representative of a difference between said reference signal and said local subcarrier signal and to produce said difference signal as said local phase angle signal.

5. A television signal receiver operable in response to a reception television signal to produce a reproduced television signal, said reception television signal including a reference signal which is concerned with each of said reception and said reproduced television signals and which has a phase angle successively varied within each cycle of said reference signal together with a phase angle signal representative of said phase angle of the reference signal, said television signal receiver comprising:

demultiplexing means for demultiplexing said reception television signal into the phase angle signal as a demultiplexed phase angle signal;

reference signal reproducing means supplied with said reproduced television signal for producing a reproduced reference signal;

phase angle signal means supplied with the demultiplexed phase angle signal and the reproduced reference signal for producing a reproduced phase angle signal with reference to the reproduced reference signal;

phase angle comparing means for comparing the reproduced phase angle signal with the demultiplexed phase angle signal to produce a difference signal representative of a difference between the reproduced phase angle signal and the demultiplexed phase angle signal; and television signal producing means for producing the reproduced television signal with reference to the difference signal.

6. A television signal receiver as claimed in claim 5, wherein said reference signal is a color subcarrier signal included in each of the reception television signal and the reproduced television signal.

7. A television signal receiver as claimed in claim 5, wherein said reference signal is derived from a horizontal synchronization signal included in each of the reception and the reproduced television signals.

8. A television signal receiver as claimed in claim 5, wherein said phase angle signal means comprises:

local reference signal producing means for producing a local reference signal having the same frequency as the reference signal;

comparing means for comparing the local reference signal with the reproduced reference signal to produce a compensation signal representative of a result of comparison between the local and the reproduced reference signals;

phase angle producing means coupled to said comparing means for successively producing a phase angle value signal representative of a phase angle value variable in dependency upon the compensation signal; and summing means for successively summing up said phase angle value signal to produce the reproduced phase angle signal.

9. A television signal transmission system comprising a transmitter operable in response to an input television signal to produce an output television signal and a receiver supplied with the output television signal as a reception television signal to produce a reproduced television signal, each of said input, said output, said reception, and said reproduced television signals including an image signal, said transmitter comprising:

reference signal producing means for producing a reference signal which is concerned with each of said input and said output television signals and which has a phase angle successively varied within each cycle of said reference signal;

phase angle signal producing means supplied with said reference signal for producing a phase angle signal representative of said phase angle of the reference signal;

processing means for processing said input television signal into a sequence of processed television signals; and multiplexing means for multiplexing said processed television signal sequence and said phase angle signal into said output television signal;

said receiver comprising:

demultiplexing means for demultiplexing said reception television signal into the image signal and the phase angle signal produced as a demultiplexed phase angle signal;

reference signal reproducing means supplied with said reproduced television signal for producing a reproduced reference signal;

phase angle signal means supplied with the demultiplexed phase angle signal and the reproduced reference signal for producing a reproduced phase angle signal with reference to the reproduced reference signal;

phase angle comparing means for comparing the reproduced phase angle signal with the demultiplexed phase angle signal to produce a difference signal representative of a difference between the reproduced phase angle signal and the demultiplexed phase angle signal; and television signal producing means for producing the reproduced television signal with reference to the difference signal.

10. A transmission system as claimed in claim 9, each of said input, said output, said reception, and said reproduced television signal further including a color subcarrier signal of a subcarrier frequency, wherein the color subcarrier signal is selected as each of the reference signal and the reproduced reference signal.

11. A transmission system as claimed in claim 9, the input television signal being sampled by a sequence of sampling clocks while the reproduce television is reproduced by a sequence of reproduced sampling clocks which is substantially equivalent to said sampling clock sequence, wherein the sampling clocks and the reproduced sampling clocks are selected as the reference signal and the reproduced reference signal, respectively.

12. A transmission system as claimed in claim 11, each of said input, said output, said reception, and said reproduced television signals further including a color subcarrier signal of a subcarrier frequency, wherein each of the sampling clocks and the reproduced sampling clocks has a clock frequency equal to an integral multiple of the subcarrier frequency.

13. A television signal transmitter as claimed in claim 1, wherein said reference signal producing means comprises:

sampling clock generating means for generating a sequence of sampling clocks in response to said input television signal; and means for supplying said sampling clock sequence directly to said phase angle producing means as said reference signal.

14. A television signal transmitter as claimed in claim 13, each of said input and said output television signals further including a color subcarrier signal of a subcarrier frequency while the sampling clocks have a clock frequency equal to an integral multiple of the subcarrier frequency, wherein said phase angle signal producing means comprises:

frequency dividing means for frequency dividing the sampling clocks into a frequency divided signal having a frequency equal to said subcarrier frequency; and phase angle generating means for generating the phase angle signal representative of the phase angle within each cycle of the frequency divided signal.

15. A television signal transmitter as claimed in claim 14, wherein said processing means comprises:

sampling means for sampling the input television signal by the sampling clocks into a sequence of sampled television signals; and coding means for coding the sampled television signal sequence into a sequence of coded television signals to produce the coded television signal sequence as the processed television signal sequence.

16. A television signal receiver operable in cooperation with the television signal transmitter claimed in claim 15 and supplied with said output television signal as a reception television signal to produce a reproduced television signal, said television signal receiver comprising:

demultiplexing means for demultiplexing said reception television signal into the image signal and the phase angle signal produced as a demultiplexed phase angle signal;

controllable sampling clock reproducing means for producing a sequence of reproduced sampling clocks having a reproduced clock frequency equal to said sampling clock sequence;

phase angle signal means supplied with the reproduced sampling clocks for producing a reproduced phase angle signal with reference to the reproduced sampling clocks;

phase angle comparing means for comparing the reproduced phase angle signal with the demultiplexed phase angle signal to calculate a difference signal representative of a difference between the reproduced phase angle signal and the demultiplexed phase angle signal and to supply said difference signal to said sampling clock reproducing means; and television signal producing means coupled to said sampling clock reproducing means for producing the reproduced television signal by the use of said reproduced sampling clocks.

17. A television signal receiver as claimed in claim 16, wherein said phase angle signal means comprises:

reference signal means for frequency dividing the reproduced sampling clocks into a sequence of frequency divided sampling clocks which has the same frequency as the subcarrier frequency;

phase angle generating means for generating a reproduced phase angle in connection with said frequency divided sampling clocks to supply said phase angle comparing means with a reproduced phase angle signal representative of the reproduced phase angle.

18. A television signal receiver as claimed in claim 17, wherein said television signal producing means comprises:

decoding means for decoding the demultiplexed image signal into a sequence of decoded image signals; and converting means coupled to said controllable sampling clock reproducing means and said decoding means for converting said decoded image signals into the reproduced television signal in accordance with the reproduced sampling clocks.

* * * * *